United States Patent
Li et al.

(10) Patent No.: US 9,652,823 B2
(45) Date of Patent: May 16, 2017

(54) METHOD AND TERMINAL DEVICE FOR CONTROLLING DISPLAY OF VIDEO IMAGE

(71) Applicant: Xiaomi Inc., Beijing (CN)

(72) Inventors: Feiyun Li, Beijing (CN); Dan Li, Beijing (CN); Yu Cheng, Beijing (CN); Mu Tang, Beijing (CN); Hongwei Guo, Beijing (CN)

(73) Assignee: XIAOMI INC., Haidian District, Beijing (CN)

(*) Notice: Subject to any disclaimer, the term of this patent is extended or adjusted under 35 U.S.C. 154(b) by 0 days.

(21) Appl. No.: 14/800,660

(22) Filed: Jul. 15, 2015

(65) Prior Publication Data

US 2016/0093015 A1    Mar. 31, 2016

Related U.S. Application Data

(63) Continuation of application No. PCT/CN2015/074625, filed on Mar. 19, 2015.

(30) Foreign Application Priority Data

Sep. 28, 2014  (CN) .......................... 2014 1 0510351

(51) Int. Cl.
```
G09G 5/00      (2006.01)
G06T 3/20      (2006.01)
G06F 3/14      (2006.01)
G09G 5/34      (2006.01)
G06F 3/0346    (2013.01)
G06F 3/01      (2006.01)
H04N 5/232     (2006.01)
```

(52) U.S. Cl.
CPC ............... *G06T 3/20* (2013.01); *G06F 3/017* (2013.01); *G06F 3/0346* (2013.01); *G06F 3/1454* (2013.01); *G09G 5/34* (2013.01); *H04N 5/23203* (2013.01); *H04N 5/23293* (2013.01); *G09G 2340/0492* (2013.01); *G09G 2354/00* (2013.01)

(58) Field of Classification Search
CPC .......................... G08B 13/19684; H04N 7/183
USPC ........................................................ 345/672
See application file for complete search history.

(56) References Cited

U.S. PATENT DOCUMENTS

| | | | | |
|---|---|---|---|---|
| 2010/0030664 A1* | 2/2010 | Omori | ............... | G06Q 30/0601 705/26.1 |
| 2012/0050331 A1* | 3/2012 | Kanda | .................. | G06F 3/1454 345/649 |
| 2014/0218517 A1* | 8/2014 | Kim | ................... | H04L 12/2818 348/143 |

FOREIGN PATENT DOCUMENTS

| | | | | |
|---|---|---|---|---|
| CN | 1933625 | A | 3/2007 | |
| CN | 101082837 | A | 12/2007 | |
| CN | 102375713 | A | 3/2012 | |
| CN | 103729118 | A | 4/2014 | |
| EP | 2341412 | A1 * | 7/2011 | ........... G06F 1/1626 |

\* cited by examiner

*Primary Examiner* — Thomas Lett
(74) *Attorney, Agent, or Firm* — Jun He Law Offices P.C.; James J. Zhu (57) ABSTRACT

The present disclosure relates to a method and a terminal device for controlling a display of a video image. The method includes: obtaining the video image captured by a smart camera device; obtaining orientation variation data of a terminal device when the video image is displayed on a screen of the terminal device; and controlling the video image to slide on the screen according to the orientation variation data of the terminal device.

15 Claims, 10 Drawing Sheets

METHOD AND TERMINAL DEVICE FOR CONTROLLING DISPLAY OF VIDEO IMAGE

CROSS REFERENCE TO RELATED APPLICATION

The present application is a Continuation application of International Application No. PCT/CN2015/074625, filed with the State Intellectual Property Office of P. R. China on Mar. 19, 2015, which is based upon and claims priority to Chinese Patent Application No. 201410510351.7, filed on Sep. 28, 2014, the entire contents of which are incorporated herein by reference.

TECHNICAL FIELD

The present disclosure generally relates to a field of communication, and more particularly, to a method and a terminal device for controlling a display of a video image.

BACKGROUND

As wireless networks become more common, various smart devices with wireless access functions are widely used. Interoperability of these smart devices may be achieved after their accessing into the wireless network. In a typical scenario, after a smart phone and a smart camera associated with the smart phone access into a wireless network respectively, a video image captured by the smart camera can be displayed in real time by the smart phone.

In the related art, when a user holds the smart phone in a conventional manner, a screen of the smart phone is in a vertical screen state. At this time, a length of the screen is less than a width of the screen. Since a length of the video image recorded by the smart camera is typically greater than a width of the video image, for example, a ratio between the length of the video image and the width of the video image is 16:9. If the entire video image is to be displayed in a screen in vertical state, it is necessary to compress the video image in a smaller window when the video image is displayed on the screen. If the video image is to be enlarged to fill the screen, the width of the video image may exceed the display width of the screen, and the user has to slide the screen left or right in order to view the video image outside the screen. Consequently, lots of touch operations are required for the user to watch the video image, which is inconvenient and resulting in a poor viewing experience.

SUMMARY

Accordingly, a method for controlling a display of a video image and a device for controlling a display of a video image are provided.

According to a first aspect of embodiments of the present disclosure, there is provided a method for controlling a display of a video image in a terminal device, including: obtaining the video image captured by a smart camera device; obtaining orientation variation data of the terminal device if the video image is displayed on a screen of the terminal device; and controlling the video image to slide on the screen according to the orientation variation data of the terminal device.

According to a second aspect of embodiments of the present disclosure, there is provided a terminal device for controlling a display of a video image, including: a processor; a memory configured to store instructions executable by the processor; in which the processor is configured to perform: obtaining the video image captured by a smart camera device; obtaining orientation variation data of the terminal device when the video image is displayed on a screen of the terminal device; and controlling the video image to slide on the screen according to the orientation variation data of the terminal device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first", "second" and "third" are used herein for describing various information, these information should not be limited by these terms. These terms are only used for distinguishing the same type of information. For example, first information may also be called second information, and similarly, the second information may also be called the first information, without departing from the scope of the present disclosure. As used herein, the term "if" may be construed to mean "when" or "upon" or "in response to determining", that a stated condition precedent is true, depending on the context.

Figure 1:
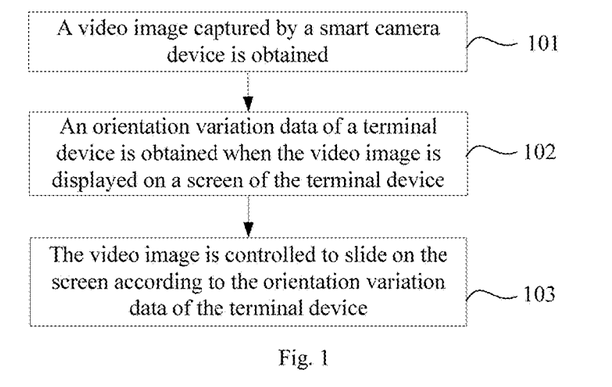
FIG. 1 is a flow chart of a method for controlling a display of a video image according to an exemplary embodiment of the present disclosure.

FIG. 1 is a flow chart of a method for controlling a display of a video image according to an exemplary embodiment of the present disclosure. The method for controlling a display of a video image may be applied in a terminal device, including following steps.

In step 101, a video image captured by a smart camera device is obtained.

The smart camera device according to embodiments of the present disclosure is a smart device having a video image capturing function and a wireless accessing function, such as a smart camera. The smart camera device may be installed as needed at any place where surveillance is required.

The terminal device according to embodiments of the present disclosure is a smart terminal device having both a wireless access function and a video image displaying function, for example, a portable terminal such as a smart phone, a tablet computer, a PDA (Personal Digital Assistant), etc.

The smart terminal device may establish a wireless connection with the smart camera device associated with the smart terminal device in advance, and then receive the video image transmitted by the smart camera device via the wireless connection. The smart camera device may transmit the video image captured in real time by itself to the smart terminal device after establishing the wireless connection with the smart terminal device, or may store the video image as a video file in its memory and then transmit the video file locally stored in the memory to the smart terminal device after establishing the wireless connection with the smart terminal device.

In step 102, orientation variation data of a terminal device is obtained when the video image is displayed on a screen of the terminal device.

According to embodiments of the present disclosure, an orientation sensor (O-sensor) may be provided in the smart terminal device. After obtaining the video image from the smart camera device, the smart terminal device displays the video image on its screen for a user to watch. The smart terminal device may start the orientation sensor when the video image is displayed, such that the orientation sensor detects angle values of the smart terminal device and transmits the angle values at predetermined intervals. Then, the smart terminal device defines a difference between two angle values transmitted by the orientation sensor at two adjacent intervals as orientation variation data of the smart terminal device.

In step 103, the video image is controlled to slide on the screen according to the orientation variation data of the terminal device.

According to embodiments of the present disclosure, after obtaining the angular variation value defined as the orientation variation data, the smart terminal device may obtain a sliding orientation of the video image according to the angular variation value, calculate a product of the angular variation and a predetermined pixel value and define the product as a sliding value of the video image. Then, the smart terminal device controls the video image to slide on the screen in the sliding orientation according to the sliding value.

According to the above embodiment, in a process of displaying the video image captured by the smart camera device, the terminal device may obtain the orientation variation data of the terminal device in real time so as to control the video image to slide on the screen according to the orientation variation data. Thus, the user may watch the entire video image without touch operations. The operation is easy and the viewing experience is good.

Figure 2:
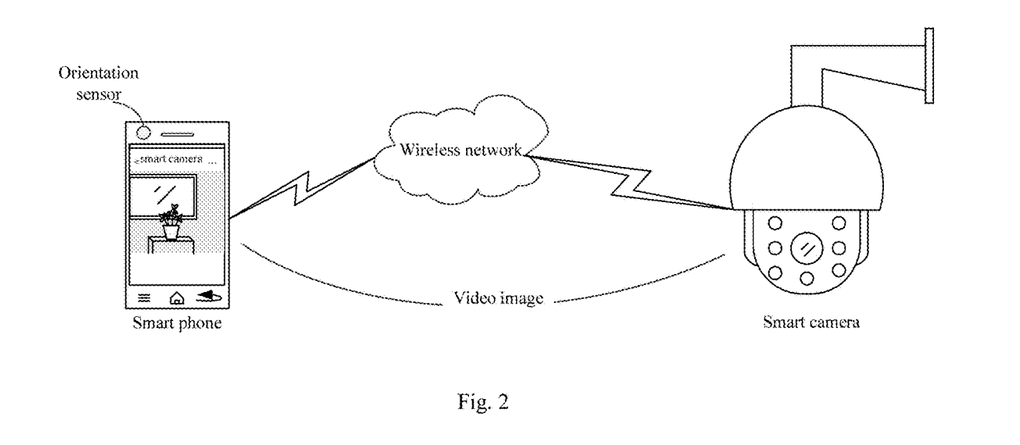
FIG. 2 is a schematic diagram illustrating a scenario of controlling a display of a video image according to another exemplary embodiment of the present disclosure.

FIG. 2 is a schematic diagram illustrating a scenario of controlling a display of a video image according to an exemplary embodiment of the present disclosure.

In FIG. 2, there are a smart phone representing the smart terminal device, and a smart camera representing the smart camera device. A wireless connection is established between the smart phone and the smart camera via the wireless network. The smart camera may transmit the video image captured by itself to the smart phone for displaying via the wireless connection. In the present disclosure, an orientation sensor is provided in the smart phone. The orientation sensor may detect angle values of the smart phone when the smart phone is displaying the video image, such that the smart phone may control the video image to slide on a screen of the smart phone automatically according to an angular variation value, and thus it is convenient for the user to watch the video image. In the following, the process of controlling a display of a video image will be described in detail with reference to an embodiment illustrated in FIG. 3.

Figure 3:
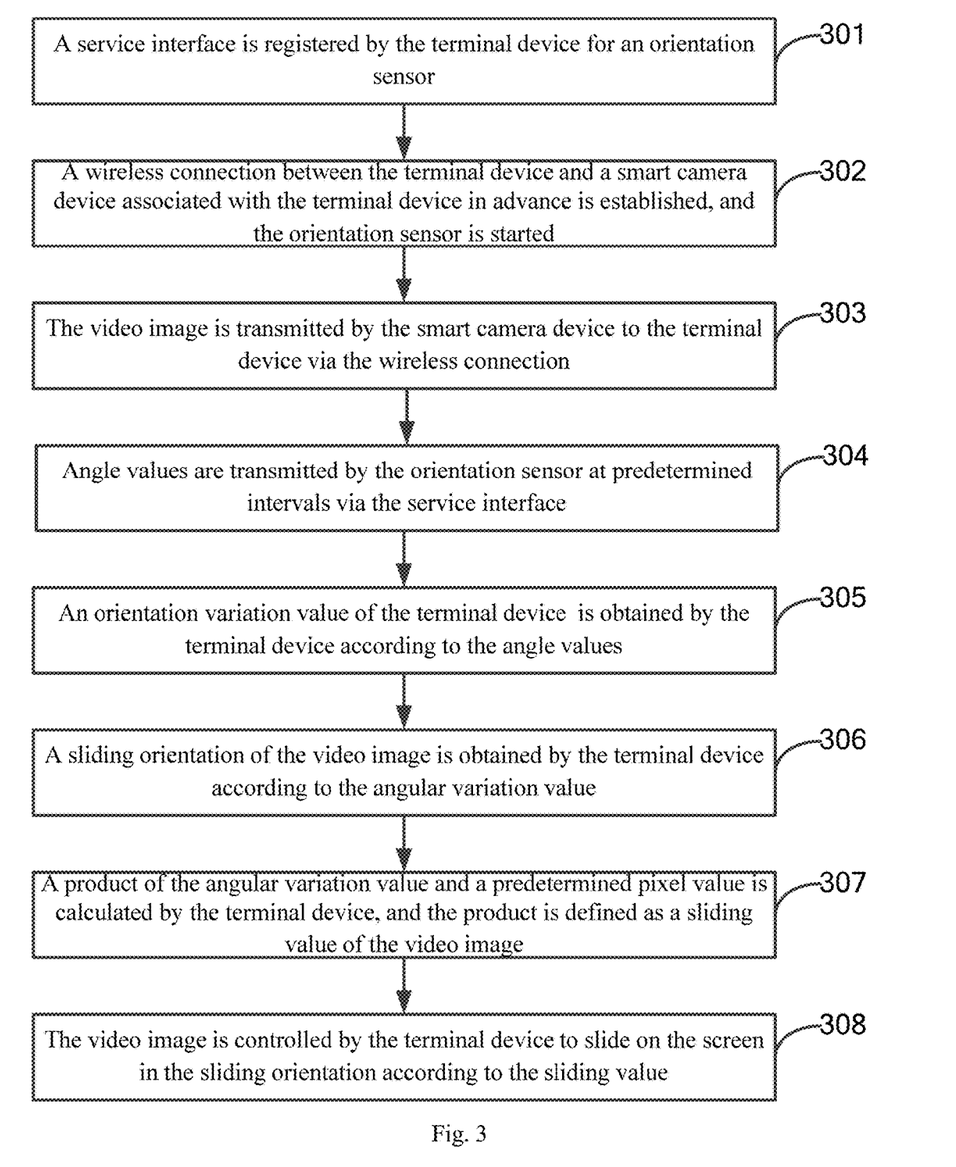
FIG. 3 is a flow chart of another method for controlling a display of a video image according to an exemplary embodiment of the present disclosure.

FIG. 3 is a flow chart of another method for controlling a display of a video image according to an exemplary embodiment of the present disclosure. The method for controlling a display of a video image may be applied in a terminal device, including following steps.

In step 301, a service interface is registered for an orientation sensor by the terminal device.

The terminal device according to embodiments of the present disclosure is a smart terminal device having a wireless access function and a video image displaying function such as a smart phone, a tablet computer, a PDA, etc. In this embodiment, a smart phone is taken as an example as a smart terminal device to explain the method for controlling a display of a video image which will not be explained separately in subsequent steps.

In embodiments of the present disclosure, the orientation sensor may be integrated on the smart phone. The orientation sensor may detect an orientation of the smart phone by detecting an inertial force in certain orientation, such that angle values that the smart phone rotates around three axes in a three-dimensional rectangular coordinate system may be returned by the orientation sensor. Initially, a service interface for the orientation sensor may be registered by calling a system interface of the smart phone, such that the orientation sensor may transmit the detected angle values of the smart phone to a processing component in the smart phone via the service interface.

In step 302, a wireless connection between the terminal device and a smart camera device associated with the terminal device is established, and the orientation sensor is started.

In embodiments of the present disclosure, a video image displaying application may be installed in the smart phone in advance. The video image displaying application may associate with some smart camera devices in advance. For example, through a camera installed by a user of the smart phone in his/her house, the user may monitor situations of his/her house.

When the user of the smart phone hopes to watch a video image captured by a camera device associated with the smart phone, after the user starts the video image displaying application, the wireless connection with the camera device may be established and the orientation sensor may be initiated at the same time, such that the angle value of the smart phone may be detected during displaying of the video image.

In step 303, the video image is transmitted by the smart camera device to the terminal device via the wireless connection.

In embodiments of the present disclosure, the video image may be transmitted in real time by the smart camera to the smart phone with which it associates. In addition, a storage space such as a local hard disk may be provided in the smart camera device. After the smart camera device is started, the video image captured by the smart camera device may be stored as a file or files in the local hard disk based on the shooting time. Therefore, the user may play a video image captured in real time by the smart camera device or play a video file stored at certain time in the local hard disk of the smart camera device through a displaying option configured in the video image displaying application. The smart camera device may transmit the video image selected by the user to the smart phone via the wireless connection.

In step 304, angle values are transmitted by the orientation sensor at predetermined intervals via the service interface.

In embodiments of the present disclosure, the orientation sensor may detect the angles of the smart phone at predetermined intervals, for example, five times per second, during the displaying of the video image by the smart phone, and transmit the detected angles to the video image displaying application on the smart phone via the registered service interface. The video image displaying application may record the angle values.

In step 305, an angular variation value of the terminal device is obtained by the terminal device based on the angle values.

In embodiments of the present disclosure, a difference between a first angle value and a second angle value is calculated to obtain the angular variation value. Herein, the first angle value is the angle value received by the smart phone at current interval and the second angle value is the angle recorded at previous interval.

In the following, a process of obtaining the angular variation value by the smart phone base on the angle values transmitted by the orientation sensor will be described with reference to FIGS. 4A-4E.

Figure 4A:
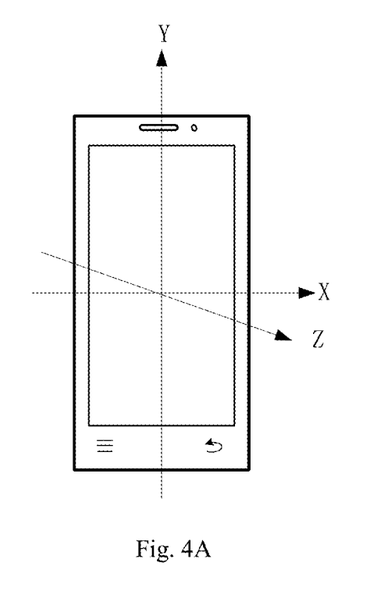
FIG. 4A is a schematic diagram illustrating that a smart phone is in a three-dimensional rectangular coordinate system.

FIG. 4A is a schematic diagram illustrating a smart phone in a three-dimensional rectangular coordinate system. An X axis is pointing right along the horizontal direction, a Y axis is pointing up the vertical direction, and a Z axis is pointing out of the front of the screen.

In an example, assuming that the ratio between the length and the width of the video image transmitted by the smart camera device is m:n, where m>n, for example, 16:9, when the user holds the smart phone vertically and the video image is displayed in a full-screen mode, although the video image may accommodate to the width of the screen, it will exceed the length of the screen. Therefore, the user may rotate the smart phone leftward and rightward, such that the orientation sensor may detect angle values of the smart phone when the smart phone is rotated leftward and rightward.

Figure 4B:
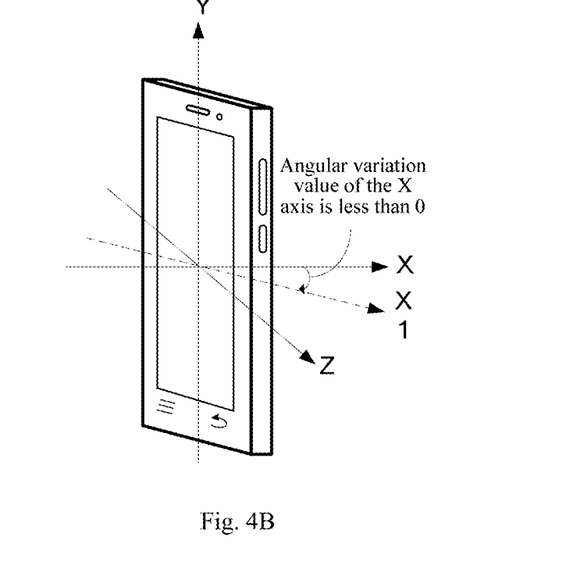
FIG. 4B is a schematic diagram illustrating an angular variation of a smart phone when the smart phone is rotated leftward by a user.

FIG. 4B is a schematic diagram illustrating an angular variation of a smart phone when the smart phone held by a user is rotated leftward. Comparing with FIG. 4A, in FIG. 4B, the smart phone is rotated leftward around the Y axis in the three-dimensional rectangular coordinate system, and an angular variation value of the X axis is less than 0.

Figure 4C:
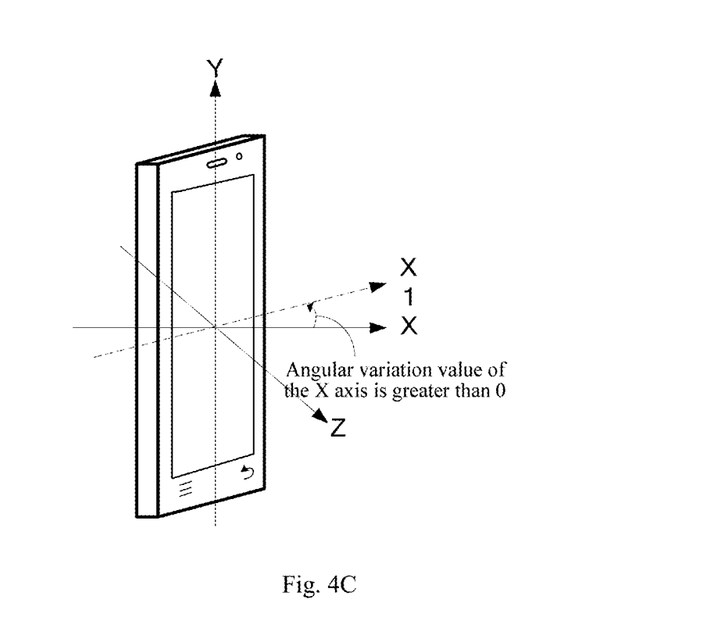
FIG. 4C is a schematic diagram illustrating an angular variation of a smart phone when the smart phone is rotated rightward by a user.

FIG. 4C is a schematic diagram illustrating an angular variation of a smart phone when the smart phone held by a user is rotated rightward. Comparing with FIG. 4A, in FIG. 4C, the smart phone is rotated rightward around the Y axis in the three-dimensional rectangular coordinate system, and an angular variation value of the X axis is greater than 0.

In another example, assuming that the ratio between the length and the width of the video image transmitted by the smart camera is n:m, where n<m, for example, 9:16, when the user holds the smart phone vertically and the video image is displayed in a full-screen mode, although the video image may accommodate to the length of the screen, it will exceed the width of the screen. Therefore, the user may rotate the smart phone upward and downward, such that the orientation sensor may detect angle values of the smart phone when the smart phone is rotated upward and downward.

Figure 4D:
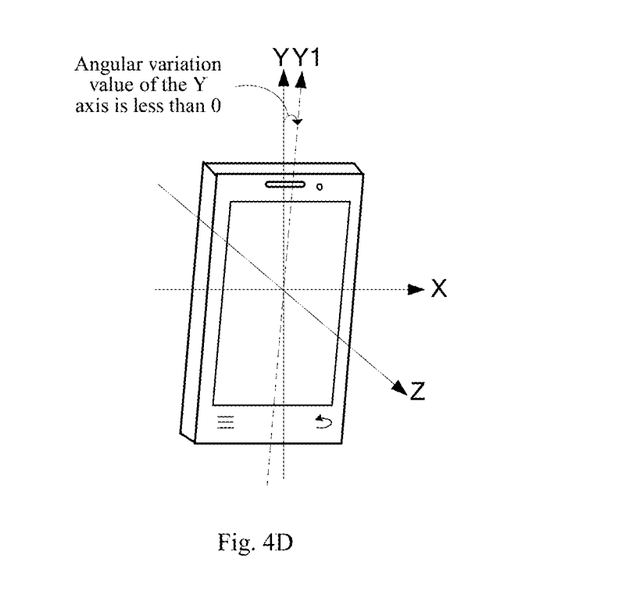
FIG. 4D is a schematic diagram illustrating an angular variation of a smart phone when the smart phone is rotated downward by a user.

FIG. 4D is a schematic diagram illustrating an angular variation of a smart phone when the smart phone held by a user is rotated downward. Comparing with FIG. 4A, in FIG. 4D, the smart phone is rotated downward around the X axis in the three-dimensional rectangular coordinate system, and an angular variation value of the Y axis is less than 0.

Figure 4E:
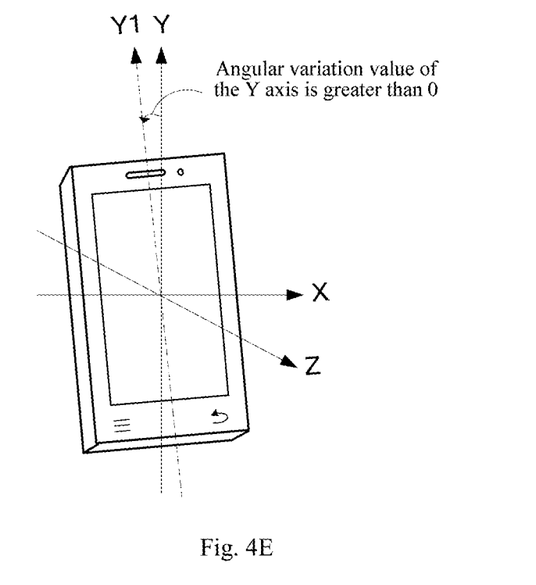
FIG. 4E is a schematic diagram illustrating an angular variation of a smart phone when the smart phone is rotated upward by a user.

FIG. 4E is a schematic diagram illustrating an angular variation of a smart phone when the smart phone held by a user is rotated upward. Comparing with FIG. 4A, in FIG. 4E, the smart phone is rotated upward around the X axis in the three-dimensional rectangular coordinate system, and an angular variation value of the Y axis is greater than 0.

In step 306, a sliding orientation of the video image is obtained by the terminal device according to the angular variation value.

In embodiments of the present disclosure, if the terminal device is rotated around the Y-axis in the three-dimensional rectangular coordinate system such that the angular variation value is a variation of the X-axis in the three-dimensional rectangular coordinate system, the sliding orientation of the video image is left or right. If the terminal device is rotated around the X-axis in the three-dimensional rectangular coordinate system such that the angular variation value is a variation of the Y-axis in the three-dimensional rectangular coordinate system, the sliding orientation of the video image is up or down.

Referring to FIG. 4B, if the angular variation value of the X axis is less than 0, the obtained sliding orientation of the video image is right. Referring to FIG. 4C, if the angular variation value of the X axis is greater than 0, the obtained sliding orientation of the video image is left. Referring to FIG. 4D, if the angular variation value of the Y axis is less than 0, the obtained sliding orientation of the video image is up. Referring to FIG. 4E, if the angular variation value of the Y axis is greater than 0, the obtained sliding orientation of the video image is down.

In step 307, a product of the angluar variation value and a predetermined pixel value is calculated by the terminal device, and the product is defined as a sliding value of the video image.

In embodiments of the present disclosure, after the sliding orientation of the video image is obtained, the sliding value on which sliding of the video image along the sliding orientation is based may be calculated based on the angluar variation value. The sliding value may be represented by a pixel value of the video image along the sliding orientation. The sliding value of the video image is calculated by multiplying the angular variation value with the predetermined pixel value. The predetermined pixel value represents the number of pixels that the video image may slide along the angle variation direction for each degree of angle value variation. An example of the predetermined pixel value may be 10. The bigger the predetermined pixel value is, the faster the video image slides. Conversely, the smaller the predetermined pixel value is, the slower the video image slides. Therefore, the predetermined pixel value may be flexibly configured to meet the viewing requirement of the user, which is not limited in embodiments of the present disclosure.

In step 308, the video image is controlled by the terminal device to slide on the screen in the sliding orientation according to the sliding value.

Figure 4F:
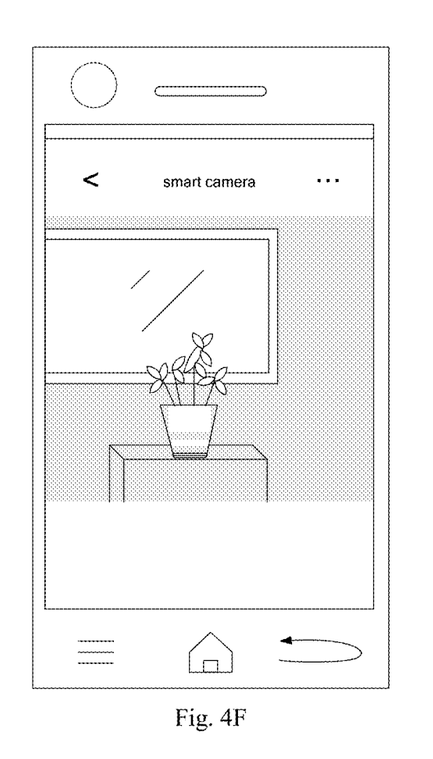
FIG. 4F is a schematic diagram illustrating that a received video image is displayed in the middle of a screen of a smart phone.
Figure 4G:
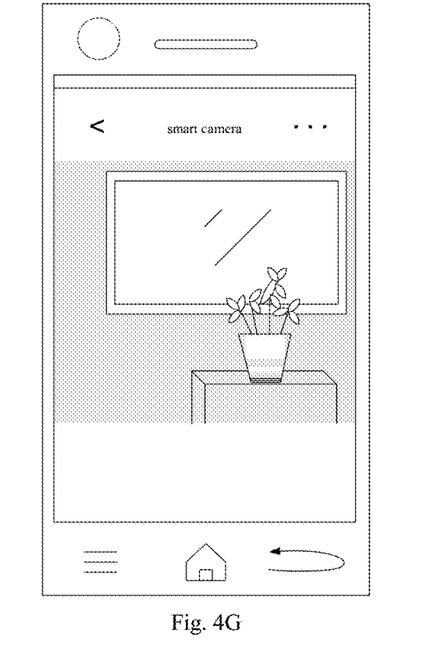
FIG. 4G is a schematic diagram illustrating that a video image is slide to the right of a screen of a smart phone.
Figure 4H:
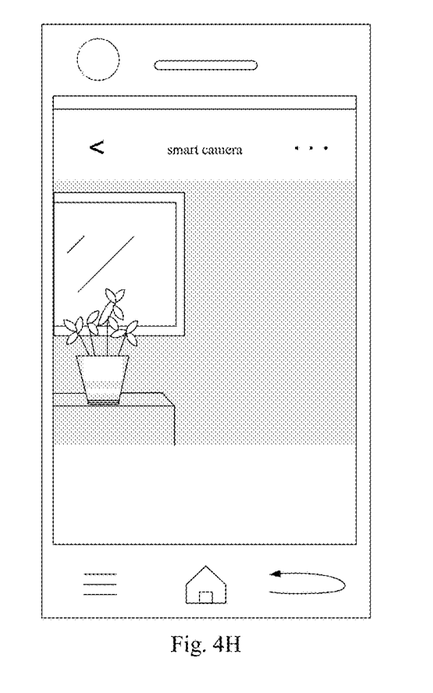
FIG. 4H is a schematic diagram illustrating that a video image is slide to the left of a screen of a smart phone.

Referring to FIGS. 4F-4H, schematic diagrams illustrating the video image being slide left or right are shown. FIG. 4F is a schematic diagram illustrating that a received video image is displayed in the middle of a screen of a smart phone. Referring to FIG. 4G, when the user rotates the small phone leftward, the video image is slide to the right accordingly such that the user may watch the left part of the entire video image. Referring to FIG. 4H, when the user rotates the smart phone rightward, the video image is slide to the left such that the user may watch the right part of the entire video image.

According to the above embodiment, the terminal device may obtain the orientation variation data of the terminal device in real time when displaying the video image captured by the smart camera device so as to control the video image to slide on the screen according to the orientation variation data. Thus, the user may watch the entire video image without touch operations. The operation is easy and the viewing experience is good.

Corresponding to the above embodiments of the method for controlling a display of a video image, the present disclosure further provides embodiments of apparatus for controlling the display of a video image and the terminal device thereof.

Figure 5:
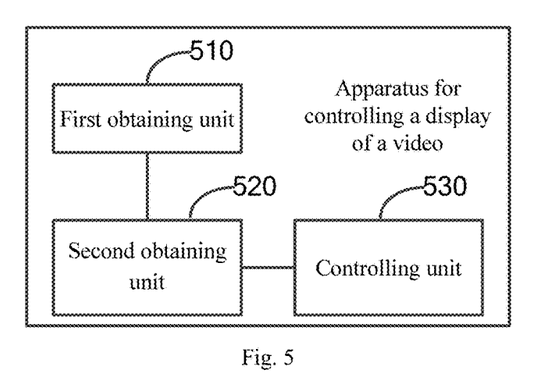
FIG. 5 is a block diagram of an apparatus for controlling a display of a video image according to an exemplary embodiment of the present disclosure.

FIG. 5 is a block diagram of an apparatus for controlling a display of a video image according to an exemplary embodiment of the present disclosure. The apparatus for controlling the display of a video image includes a first obtaining unit 510, a second obtaining unit 520 and a controlling unit 530.

The first obtaining unit 510 is configured to obtain the video image captured by a smart camera device.

The second obtaining unit 520 is configured to obtain orientation variation data of a terminal device if the video image is displayed on a screen of the terminal device.

The controlling unit 530 is configured to control the video image to slide on the screen according to the orientation variation data of the terminal device.

According to the above embodiment, the terminal device may obtain the orientation variation data of the terminal device in real time when displaying the video image captured by the smart camera device so as to control the video image to slide on the screen according to the orientation variation data. Thus, the user may watch the entire video image without touch operations. The operation is easy and the viewing experience is good.

Figure 6:
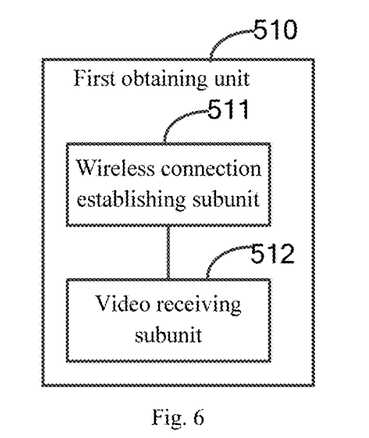
FIG. 6 is a block diagram of another apparatus for controlling a display of a video image according to an exemplary embodiment of the present disclosure.

FIG. 6 is a block diagram of another apparatus for controlling a display of a video image according to an exemplary embodiment of the present disclosure. Based on the above embodiment illustrated in FIG. 5, the first obtaining unit 510 may include a wireless connection establishing subunit 511 and a video image receiving subunit 512.

The wireless connection establishing subunit 511 is configured to establish a wireless connection with the smart camera device.

The video image receiving subunit 512 is configured to receive the video image transmitted by the smart camera device via the wireless connection, in which the video image comprises a video image captured in real time by the smart camera device, or a video image in a video file locally stored in the smart camera device.

According to the above embodiment, after a wireless connection between the terminal device and the smart camera device is established, the terminal device may obtain in real time the video image transmitted by the smart camera device and may display the video image captured in real time by the smart camera device or the video stored in the smart camera device using the wireless access functions of the terminal device and the smart camera device, thus meeting different requirements of a user.

Figure 7:
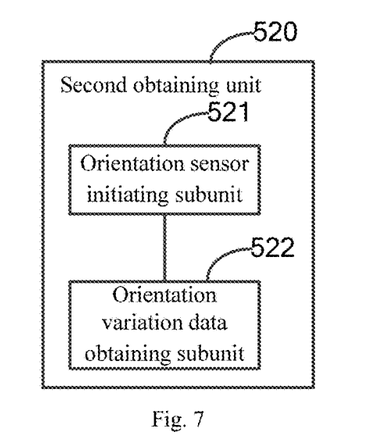
FIG. 7 is a block diagram of another apparatus for controlling a display of a video image according to an exemplary embodiment of the present disclosure.

FIG. 7 is a block diagram of another apparatus for controlling a display of a video image according to an exemplary embodiment of the present disclosure. Based on the above embodiment illustrated in FIG. 5 or FIG. 6, the second obtaining unit 520 may include an orientation sensor initiating subunit 521 and orientation variation data obtaining subunit 522.

The orientation sensor initiating subunit 521 is configured to initiate a orientation sensor, in which the orientation sensor is configured to detect angle values of the terminal device.

The orientation variation data obtaining subunit 522 is configured to obtain the orientation variation data of the terminal device according to the angle values of the terminal device transmitted by the orientation sensor at predetermined intervals.

Figure 8:
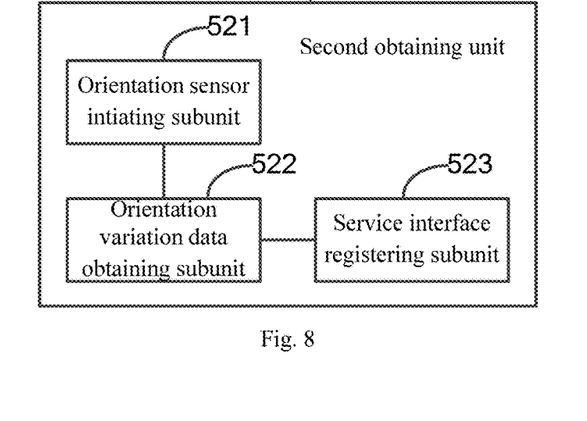
FIG. 8 is a block diagram of another apparatus for controlling a display of a video image according to an exemplary embodiment of the present disclosure.

FIG. 8 is a block diagram of another apparatus for controlling a display of a video image according to an exemplary embodiment of the present disclosure. Based on the above embodiment illustrated in FIG. 7, the second obtaining unit 520 may further include a service interface registering subunit 523.

The service interface registering subunit 523 is configured to register a service interface for the orientation sensor such that the orientation sensor may send the orientation data (which is also called angle values in the following text) of the terminal device via the service interface.

According to the above embodiment, by using the characteristic that the orientation sensor may detect angle values in real time, the orientation variation data of the terminal device may be obtained by the orientation sensor provided on the terminal device, such that the sliding of the video image may be controlled according to the orientation variation data, thereby ensuring that the user can watch the entire video image conveniently.

Figure 9:
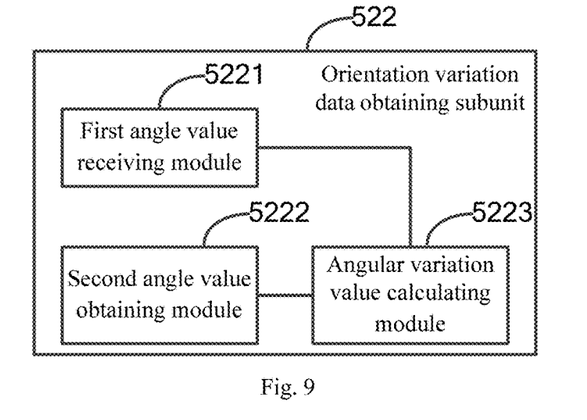
FIG. 9 is a block diagram of another apparatus for controlling a display of a video image according to an exemplary embodiment of the present disclosure.

FIG. 9 is a block diagram of another apparatus for controlling a display of a video image according to an exemplary embodiment of the present disclosure. Based on the above embodiment illustrated in FIG. 7 or FIG. 8, the orientation variation data obtaining subunit 522 may further include a first angle value receiving module 5221, a second angle value obtaining module 5222 and an angular variation value calculating module 5223.

The first angle value receiving module 5221 is configured to receive a first angle value transmitted by the orientation sensor at a current interval.

The second angle value obtaining module 5222 is configured to obtain a second angle value recorded by the terminal device, in which the second angle value is an angle value transmitted by the orientation sensor at a previous interval relative to the current interval.

The angular variation value calculating module 5223 is configured to calculate a difference between the first angle value and the second angle value to obtain an angular variation value defined as the orientation variation data of the terminal device.

Figure 10:
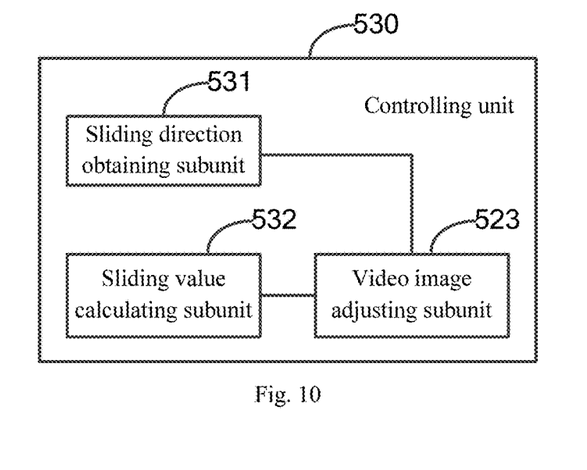
FIG. 10 is a block diagram of another apparatus for controlling a display of a video image according to an exemplary embodiment of the present disclosure.

FIG. 10 is a block diagram of another apparatus for controlling a display of a video image according to an exemplary embodiment of the present disclosure. Based on any of the above embodiments illustrated in FIGS. 5-9, the controlling unit 530 may include a sliding orientation obtaining subunit 531, a sliding value calculating subunit 532 and a video image adjusting subunit 533.

The sliding orientation obtaining subunit 531 is configured to obtain a sliding orientation of the video image according to the orientation angular variation value if the orientation variation data is the orientation angular variation value.

The sliding value calculating subunit 532 is configured to calculate a sliding value of the video image by multiplying the angular variation value and a predetermined pixel value.

The video image adjusting subunit 533 is configured to control the video image to slide on the screen in the sliding orientation according to the sliding value.

According to the above embodiment, by using the angle values detected by the orientation sensor at different intervals, the angular variation value defined as the orientation variation data may be obtained, and the sliding orientation and the sliding value of the video image may be determined according to the angular variation value, such that the sliding of the video image on the screen may be accurately controlled and thus the viewing experience of a user may be improved.

Figure 11:
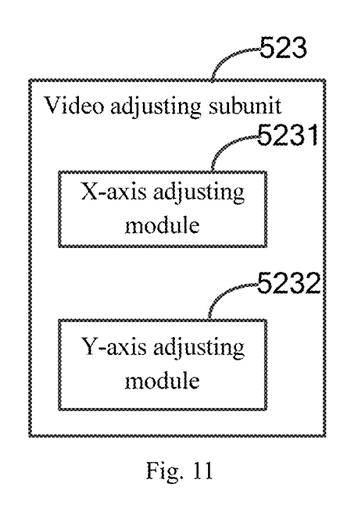
FIG. 11 is a block diagram of another apparatus for controlling a display of a video image according to an exemplary embodiment of the present disclosure.

FIG. 11 is a block diagram of another apparatus for controlling a display of a video image according to an exemplary embodiment of the present disclosure. Based on the above embodiment illustrated in FIG. 10, the video image adjusting subunit 533 may include at least one of the following modules: an X-axis adjusting module 5331, a Y-axis adjusting module 5332.

The X-axis adjusting module 5331 is configured to adjust the video image such that the video image may slide left or right on the screen according to the angular variation value if the angular variation value is a variation value of the X-axis in a three-dimensional rectangular coordinate system when the terminal device is rotated around the Y-axis in the three-dimensional rectangular coordinate system.

A Y-axis adjusting module 5332 is configured to adjust the video image to such that the video image may slide up or down on the screen according to the angular variation value if the angular variation value is a variation value of the Y-axis in a three-dimensional rectangular coordinate system when the terminal device is rotated around the X-axis in the three-dimensional rectangular coordinate system.

It should be noted that, in consideration of illustration convenience, both the X-axis adjusting module and the Y-axis adjusting module are shown in FIG. 11. In practice, only one of the X-axis adjusting module and the Y-axis adjusting module may be necessary to be provided, which is not limited in embodiments of the present disclosure.

According to the above embodiment, different sliding orientation of the video image may be determined according to different types of angular variation values to meet viewing requirements of a user on different ratios of video images.

Correspondingly, the present disclosure further provides a device for controlling a display of a video image, including a processor, a memory configured to store instructions executable by the processor. The professor is configured to perform: obtaining the video image captured by a smart camera device; obtaining orientation variation data of a terminal device when the video image is displayed on a screen of the terminal device; and controlling the video image to slide on the screen according to the orientation variation data of the terminal device.

With respect to the devices in the above embodiments, the specific manners for performing operations for individual modules therein have been described in detail in the embodiments regarding the methods for controlling a display of a video image, which are not elaborated herein again.

Embodiments of the devices correspond to embodiments of the methods. For a related content, reference is made to partial descriptions of the embodiments of the methods. The above embodiments of the devices are exemplary. Units described as separate components may be or may not be physically separated. Components shown as units may be or may not be physical units, in other words, may be integrated in one position or distributed to a plurality of network units. Some or all of the modules may be selected to achieve the objective of the solution of the embodiments according to actual requirements. Those skilled in the art may understand and implement the present disclosure without making creative efforts.

Figure 12:
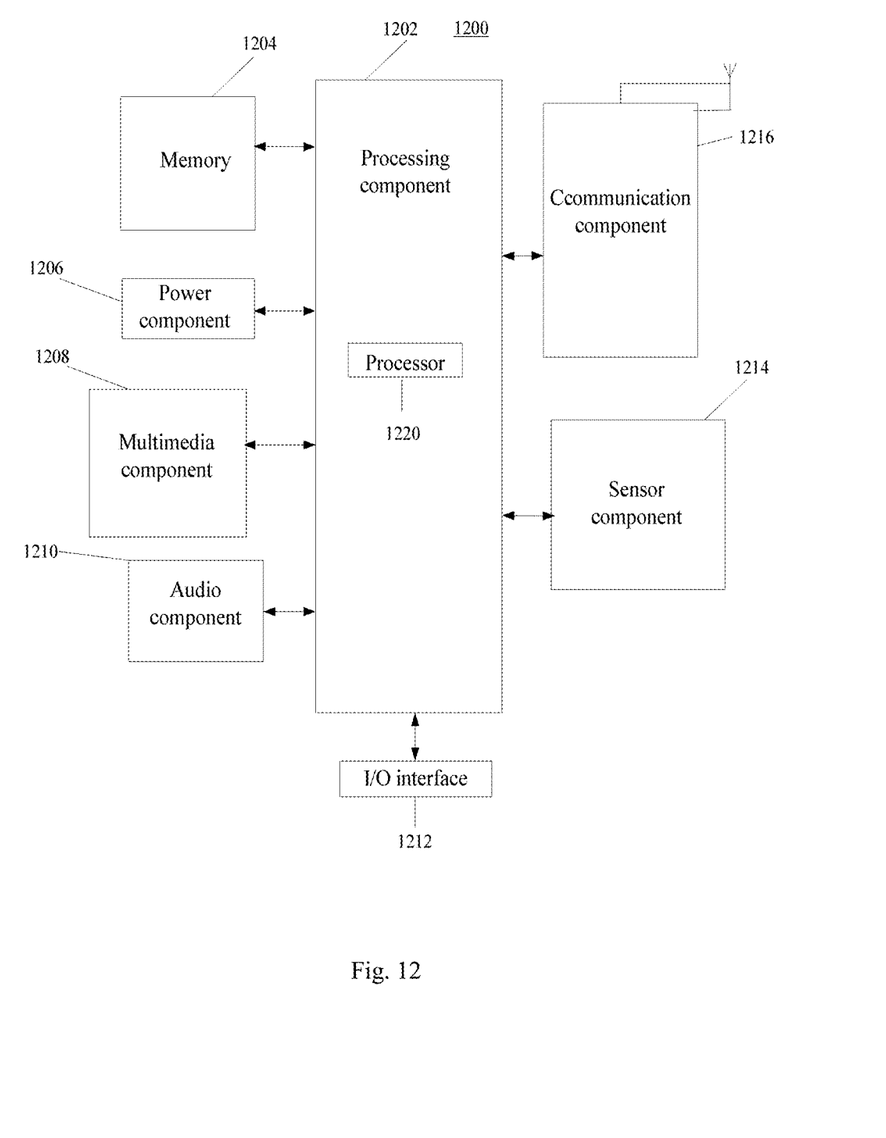
FIG. 12 is a block diagram of a terminal device for controlling a display of a video image according to an exemplary embodiment of the present disclosure.

FIG. 12 is a block diagram of a terminal device 1200 for controlling a display of a video image according to an exemplary embodiment of the present disclosure. For example, the terminal device 1200 may be a mobile phone with a routing function, a computer, a digital broadcasting terminal, a message receiving and sending equipment, a game controller, a tablet device, a medical equipment, a fitness equipment, a PDA and so on.

Referring to FIG. 12, the terminal device 1200 may include one or more of the following components: a processing component 1202, a memory 1204, a power component 1206, a multimedia component 1208, an audio component 1210, an input/output (I/O) interface 1212, a sensor component 1214 and a communication component 1216.

The processing component 1202 typically controls overall operations of the terminal device 1200, such as the operations associated with display, telephone calls, data communications, camera operations, and recording operations. The processing component 1202 may include one or more processors 1220 to execute instructions so as to perform all or a part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the terminal device 1200. Examples of such data include instructions for any applications or methods operated on the terminal device 1200, contact data, phonebook data, messages, pictures, videos, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 is configured to provide power to various components of the terminal device 1200. The power component 1206 may include a power management system, one or more power sources, and other components associated with the generation, control, and distribution of power in the terminal device 1200.

The multimedia component 1208 includes a screen configured to provide an output interface between the terminal device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1208 includes a front camera and/or a rear camera. The front camera and the rear camera may receive external multimedia data when the terminal device 1200 is in an operation mode such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the terminal device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 is configured to provide an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the terminal device 1200. For instance, the sensor component 1214 may detect an on/off status of the terminal device 1200, relative positions of components (e.g., a display screen and a keypad) of the terminal device 1200. The sensor component 1214 may further detect a change in position of the terminal device 1200 or a component of the terminal device 1200, a presence or absence of user contact with the terminal device 1200, an orientation or an acceleration/deceleration of the terminal device 1200, and a change in temperature of the terminal device 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may also include an accelerometer sensor, a gyroscope sensor, a magnetic sensor, a pressure sensor, a microwave sensor, or a temperature sensor.

The communication component 1216 is configured to facilitate a wired or wireless communication between the terminal device 1200 and other devices. The terminal device 1200 can access a wireless network based on a communication standard, such as WiFi, 2G, or 3G, or a combination thereof. In one exemplary embodiment, the communication component 1216 receives a broadcast signal or broadcast associated information from an external broadcast control system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In exemplary embodiments, the terminal device 1200 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is further provided a non-transitory computer readable storage medium including instructions, such as the memory 1204 including instructions executable by the processor 1220 in the terminal device 1200 to perform the above-described methods. For example, the non-transitory computer-readable storage medium may be a ROM, a RAM, a CD-ROM, a magnetic tape, a floppy disc, an optical data storage device, and the like.

The execution of the instructions stored in the non-transitory computer-readable storage medium is by a processor of the terminal device causes the terminal device execute a method for controlling a display of a video image. The method includes: obtaining the video image captured by a smart camera device; obtaining orientation variation data of the terminal device if the video image is displayed on a screen of the terminal device; and controlling the video image to slide on the screen according to the orientation variation data of the terminal device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a display of a video image in a terminal device, comprising:
    obtaining the video image captured by a smart camera device;
    initiating an orientation sensor when the video image is displayed on a screen of the terminal device, wherein the orientation sensor is configured to detect orientation data of the terminal device and transmit the orientation data at predetermined intervals;
    receiving the orientation data transmitted by the orientation sensor and obtaining orientation variation data of the terminal device based on the orientation data; and
    controlling the video image to slide on the screen according to the orientation variation data of the terminal device.

2. The method according to claim 1, wherein obtaining the video image captured by the smart camera device comprises:
    establishing a wireless connection with the smart camera device; and
    receiving the video image transmitted by the smart camera device via the wireless connection, wherein the video image comprises a video image captured in real time by the smart camera device or a video image in a video file locally stored in the smart camera device.

3. The method according to claim 1, before starting the orientation sensor, further comprising:
    registering a service interface for the orientation sensor such that the orientation sensor sends the orientation data of the terminal device via the service interface.

4. The method according to claim 1, wherein receiving the orientation data transmitted by the orientation sensor and obtaining the orientation variation data of the terminal device based on the orientation data comprises:
    receiving a first angle value transmitted by the orientation sensor at a current interval;
    obtaining a second angle value recorded by the terminal device, wherein the second angle value is an angle value transmitted by the orientation sensor at a previous interval preceeding to the current interval; and
    calculating a difference between the first angle value and the second angle value to obtain an angular variation value as the orientation variation data of the terminal device.

5. The method according to claim 1, wherein controlling the video image to slide on the screen according to the orientation variation data of the terminal device comprises:
    obtaining a sliding orientation of the video image according to the angular variation value, wherein the orientation variation data of the terminal device is an angular variation value;
    calculating a product of the angular variation value and a predetermined pixel value and defining the product as a sliding value of the video image; and
    controlling the video image to slide on the screen in the sliding orientation according to the sliding value.

6. The method according to claim 5, wherein controlling the video image to slide on the screen in the sliding orientation according to the sliding value comprises:
    controlling the video image to slide left or right on the screen according to an angular variation value of the X-axis in a three-dimensional rectangular coordinate system, wherein the angular variation value is an angular variation value of the X-axis when the terminal device rotates around the Y-axis in the three-dimensional rectangular coordinate system.

7. The method according to claim 5, wherein controlling the video image to slide on the screen in the sliding orientation according to the sliding value comprises:
    controlling the video image to slide up or down on the screen according to an angular variation value of the Y-axis in a three-dimensional rectangular coordinate system, wherein the angular variation value is an angular variation value of the Y-axis when the terminal device rotates around the X-axis in the three-dimensional rectangular coordinate system.

8. A terminal device for controlling a display of a video image, comprising:
    a processor;
    a memory configured to store instructions executable by the processor;
    wherein the processor is configured to perform:
    obtaining the video image captured by a smart camera device;
    initiating an orientation sensor when the video image is displayed on a screen of the terminal device, wherein the orientation sensor is configured to detect orientation data of the terminal device and transmit the orientation data at predetermined intervals;
    receiving the orientation data transmitted by the orientation sensor and obtaining orientation variation data of the terminal device based on the orientation data; and
    controlling the video image to slide on the screen according to the orientation variation data of the terminal device.

9. The terminal device according to claim 8, wherein obtaining the video image captured by the smart camera device comprises:
    establishing a wireless connection with the smart camera device; and
    receiving the video image transmitted by the smart camera device via the wireless connection, wherein the video image comprises a video image captured in real time by the smart camera device or a video image in a video file locally stored in the smart camera device.

10. The terminal device according to claim 8, before starting the orientation sensor, the processor is configured to further perform:
    registering a service interface for the orientation sensor such that the orientation sensor sends the orientation data of the terminal device via the service interface.

11. The terminal device according to claim 8, wherein receiving the orientation data transmitted by the orientation sensor and obtaining the orientation variation data of the terminal device based on the orientation data comprises:
    receiving a first angle value transmitted by the orientation sensor at a current interval;
    obtaining a second angle value recorded by the terminal device, wherein the second angle value is an angle value transmitted by the orientation sensor at a previous interval preceeding to the current interval; and
    calculating a difference between the first angle value and the second angle value to obtain an angular variation value as the orientation variation data of the terminal device.

12. The terminal device according to claim 8, wherein controlling the video image to slide on the screen according to the orientation variation data of the terminal device comprises:
    obtaining a sliding orientation of the video image according to the angular variation value, wherein the orientation variation data of the terminal device is an angular variation value;
    calculating a product of the angular variation value and a predetermined pixel value and defining the product as a sliding value of the video image; and
    controlling the video image to slide on the screen in the sliding orientation according to the sliding value.

13. The terminal device according to claim 12, wherein controlling the display image of the video image to slide on the screen in the sliding orientation according to the sliding value comprises:
    controlling the video image to slide left or right on the screen according to an angular variation value of the X-axis in a three-dimensional rectangular coordinate system, wherein the angular variation value is an angular variation value of the X-axis when the terminal device rotates around the Y-axis in the three-dimensional rectangular coordinate system.

14. The terminal device according to claim 12, wherein controlling the display image of the video image to slide on the screen in the sliding orientation according to the sliding value comprises:
    controlling the video image to slide up or down on the screen according to an angular variation value of the Y-axis in a three-dimensional rectangular coordinate system, wherein the angular variation value is an angular variation value of the Y-axis when the terminal device rotates around the X-axis in the three-dimensional rectangular coordinate system.

15. A non-transitory computer-readable storage medium having stored therein instructions that, when executed by a processor of a terminal device, causes the terminal device to perform a method for controlling a display of a video image, the method comprising:
    obtaining the video image captured by a smart camera device;
    initiating an orientation sensor when the video image is displayed on a screen of the terminal device, wherein the orientation sensor is configured to detect orientation data of the terminal device and transmit the orientation data at predetermined intervals;
    receiving the orientation data transmitted by the orientation sensor and obtaining orientation variation data of the terminal device based on the orientation data; and
    controlling the video image to slide on the screen according to the orientation variation data of the terminal device.

* * * * *